United States Patent
Sarawate et al.

(10) Patent No.: US 10,415,579 B2
(45) Date of Patent: Sep. 17, 2019

(54) CERAMIC COATING COMPOSITIONS FOR COMPRESSOR BLADE AND METHODS FOR FORMING THE SAME

(71) Applicant: General Electric Company, Schenectady, NY (US)

(72) Inventors: Neelesh Nandkumar Sarawate, Niskayuna, NY (US); Larry Steven Rosenzweig, Clifton Park, NY (US); Sathyanarayanan Raghavan, Ballston Lake, NY (US); Changjie Sun, Clifton Park, NY (US); Ananda Barua, Schenectady, NY (US); Jinjie Shi, Clifton Park, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 697 days.

(21) Appl. No.: 15/278,860

(22) Filed: Sep. 28, 2016

(65) Prior Publication Data
US 2018/0087515 A1    Mar. 29, 2018

(51) Int. Cl.
*F01D 5/14* (2006.01)
*F04D 29/02* (2006.01)
(Continued)

(52) U.S. Cl.
CPC .............. *F04D 29/023* (2013.01); *C23C 4/11* (2016.01); *C23C 4/134* (2016.01); *C23C 30/00* (2013.01); *F01D 5/284* (2013.01); *F01D 5/288* (2013.01); *F04D 29/324* (2013.01); *F02C 3/06* (2013.01); *F05D 2230/312* (2013.01); *F05D 2230/90* (2013.01); *F05D 2240/303* (2013.01); *F05D 2240/307* (2013.01); *F05D 2300/2118* (2013.01); *F05D 2300/501* (2013.01); *F05D 2300/506* (2013.01); *F05D 2300/611* (2013.01); *Y02T 50/672* (2013.01)

(58) Field of Classification Search
CPC ........ F01D 5/284; F01D 5/288; F01D 11/222; F04D 29/324; F04D 29/388; F05D 2230/90; F05D 2240/307; F05D 2300/611
See application file for complete search history.

(56) References Cited

U.S. PATENT DOCUMENTS

| | | |
|---|---|---|
| 5,603,603 A | 2/1997 | Benoit et al. |
| 5,794,338 A | 8/1998 | Bowden, Jr. et al. |

(Continued)

OTHER PUBLICATIONS

Hardness Conversion Table; http://www.engineershandbook.com/Tables/hardness.htm. (Year: 2006).*

(Continued)

*Primary Examiner* — Ninh H. Nguyen
(74) *Attorney, Agent, or Firm* — Christopher R. Carroll; The Small Patent Law Group LLC

(57) ABSTRACT

Coating systems for components of a gas turbine engine, such as a compressor blade tip, are provided. The coating system can include a ceramic material disposed along the compressor blade tip and may be used with a bare compressor casing. The ceramic coating is harder than the bare compressor casing and can reduce the rub ratio thereby increasing the lifetime of the compressor blades. Methods are also provided for applying the coating system onto a compressor blade.

17 Claims, 9 Drawing Sheets

(51) Int. Cl.
*F04D 29/32* (2006.01)
*C23C 30/00* (2006.01)
*F01D 5/28* (2006.01)
*C23C 4/11* (2016.01)
*C23C 4/134* (2016.01)
*F02C 3/06* (2006.01)

(56) References Cited

U.S. PATENT DOCUMENTS

| | | | |
|---|---|---|---|
| 5,952,110 A * | 9/1999 | Schell | F01D 11/12 |
| | | | 205/109 |
| 6,190,124 B1 | 2/2001 | Freling et al. | |
| 6,461,108 B1 | 10/2002 | Lee et al. | |
| 6,641,907 B1 | 11/2003 | Merrill et al. | |
| 6,755,619 B1 * | 6/2004 | Grylls | F01D 5/20 |
| | | | 415/173.1 |
| 7,510,370 B2 * | 3/2009 | Strangman | C23C 26/02 |
| | | | 415/173.4 |
| 7,582,359 B2 | 9/2009 | Sabol et al. | |
| 7,955,707 B2 | 6/2011 | Xie et al. | |
| 8,187,717 B1 | 5/2012 | Xie et al. | |
| 8,740,572 B2 | 6/2014 | Hoebel et al. | |
| 8,845,283 B2 * | 9/2014 | Cairo | F04D 29/023 |
| | | | 415/173.3 |
| 9,316,110 B2 | 4/2016 | Cottom et al. | |
| 9,341,066 B2 | 5/2016 | Bintz et al. | |
| 2004/0219010 A1 | 11/2004 | Merrill et al. | |
| 2005/0129511 A1 | 6/2005 | Allen | |
| 2006/0056959 A1 | 3/2006 | Sabol et al. | |
| 2008/0026160 A1 | 1/2008 | Taylor et al. | |
| 2008/0286108 A1 | 11/2008 | Lui et al. | |
| 2011/0302781 A1 | 12/2011 | Dodd et al. | |
| 2012/0114929 A1 | 5/2012 | Xie et al. | |
| 2013/0084167 A1 | 4/2013 | Hewitt et al. | |
| 2014/0147242 A1 * | 5/2014 | Ghasripoor | F16J 15/445 |
| | | | 415/1 |

OTHER PUBLICATIONS

Xie et al., "Analysis of Super alloy Turbine Blade Tip Cracking During Service", Engineering Failure Analysis, vol. 13, Issue 8, pp. 1429-1436, Dec. 2006.

Hermosilla et al., "Finite Element Modelling of the Development of Stresses in Thermal Barrier Coatings", International Conference on Sustainable Power Generation and Supply, pp. 1-7, Apr. 6-7, 2009.

Carstens, "New Thermal Barrier Coatings (TBC) with an Inner LiO2 Doped YSZ Thin Layer for Gas Turbines Blade Durability Improvement", Siemens AG, vol. 9, Issue 9B, Sep. 25, 2009.

* cited by examiner

CERAMIC COATING COMPOSITIONS FOR COMPRESSOR BLADE AND METHODS FOR FORMING THE SAME

FIELD

Embodiments of the present invention generally relate to ceramic coating systems for metallic components, particularly for use on a compressor blade in a gas turbine engine.

BACKGROUND

Gas turbine engines typically include a compressor for compressing air. The compressor includes a series of stages of blades rotating around a shaft. The compressed air is mixed with a fuel and channeled to a combustor, where the mixture is ignited within a combustion chamber to generate hot combustion gases. The combustion gases are channeled to a turbine. The turbine section of a gas turbine engine contains a rotor shaft and one or more turbine stages, each having a turbine disk (or rotor) mounted or otherwise carried by the shaft and turbine blades mounted to and radially extending from the periphery of the disk. A turbine assembly typically generates rotating shaft power by expanding hot compressed gas produced by the combustion of a fuel. Gas turbine buckets or blades generally have an airfoil shape designed to convert the thermal and kinetic energy of the flow path gases into mechanical rotation of the rotor.

In a compressor, as well as in a turbine, engine performance and efficiency may be enhanced by reducing the space between the tip of the rotating blades and the respective casing to limit the flow of air over or around the top of the blade that would otherwise bypass the blade. For example, a compressor blade may be configured so that its tip fits close to the compressor casing during engine operation. During engine operation, however, blade tips may rub against the casing, thereby increasing the gap and resulting in a loss of efficiency, or in some cases, damaging or destroying the blade set. Blade material may be transferred to the compressor case creating scabs on the casing that extend into the clearance between the blades and casing, further aggravating any rubbing against the blade tip. In addition, the high speeds that the compressor blades are moving at increase the local temperature at the blade tip such that the metal blade tip may melt. The melting or softening of the blade tip may then lead to additional removal of the blade tip material when rubbed against the compressor case.

Thus, an improved design of a compressor blade and a compressor blade and case assembly is desirable in the art.

BRIEF DESCRIPTION

Aspects and advantages of the invention will be set forth in part in the following description, or may be obvious from the description, or may be learned through practice of the invention.

A coated compressor blade is generally provided, the coated compressor blade comprising a compressor blade having a blade tip with a surface, wherein the compressor blade comprises a base material, and a coating system comprising a ceramic material disposed along the blade tip surface. In some embodiments, the ceramic material comprises yttria stabilized zirconia.

In certain embodiments, the coating system has a uniform thickness across the blade tip surface, while in some embodiments, the blade tip surface has a leading edge, a mid-chord, and a trailing edge and the coating system has a larger thickness along the leading edge than along the trailing edge. Still further, in some embodiments, the blade tip surface has a leading edge, a mid-chord, and a trailing edge and the coating system is disposed along the leading edge and not disposed along the trailing edge.

In certain embodiments, the coating system has a hardness of about 25 HRC to about 75 HRC. The coating system may have a thickness of about 127 microns to about 254 microns. In some embodiments, the coating system does not include a bond coat.

In certain embodiments, coated compressor blade has a curved body, and in some embodiments, the compressor case is configured to be positioned in a turbofan engine.

Aspects of the present disclosure are also drawn to a gas turbine engine comprising a compressor comprising a compressor case having an inner surface, wherein the compressor case comprises a base material, and a compressor blade having a blade tip, wherein the compressor blade comprises a base material and is uncoated and a coating system disposed along the blade tip of the compressor blade, wherein the coating system comprises a ceramic material. In some embodiments, the coating system does not include a bond coat, and in certain embodiments, the coating system has a higher hardness than a hardness of the compressor case base material. In certain embodiments, the coating system has a hardness about 10% to about 50% higher than a hardness of the compressor case base material.

Aspects of the present disclosure are also drawn to a method of preparing a coated compressor blade, the method comprising forming a coating system comprising a ceramic material along a surface of a blade tip of a compressor blade. In some embodiments, forming the coating system along the surface of the blade tip comprises forming the ceramic material along a leading edge of the blade tip to a thickness of about 127 microns to about 254 microns. In some embodiments, forming the coating system along the surface of the blade tip comprises forming the ceramic material along a leading edge of the blade tip to a thickness of about 127 microns to about 254 microns and not disposing ceramic material along a trailing edge of the blade tip.

In certain embodiments, the coating system has a hardness of about 25 HRC to about 75 HRC.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Figure 1A:
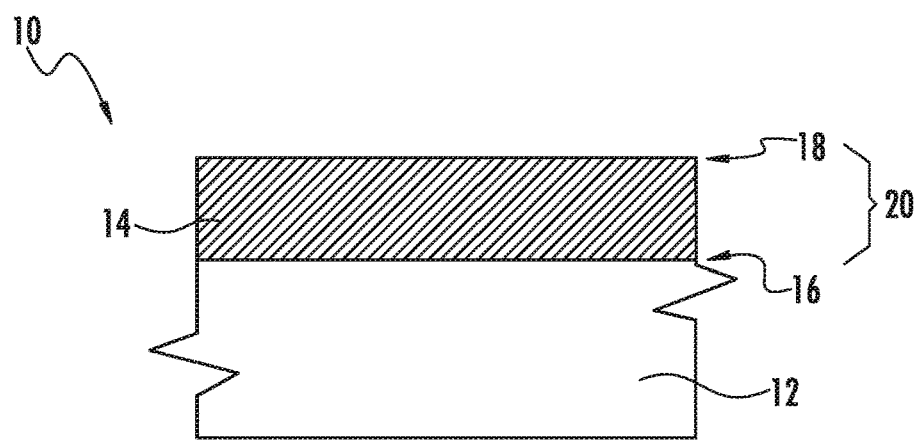
FIGS. 1a and 1b are schematic views of an exemplary compressor blade comprising a coating system in accordance with one embodiment of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The terms "upstream" and "downstream" refer to the relative direction with respect to fluid flow in a fluid pathway. For example, "upstream" refers to the direction from which the fluid flows, and "downstream" refers to the direction to which the fluid flows.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

A coating system for a compressor blade, for instance a compressor blade tip, is generally provided herein, along with methods of forming such coating system. The composition of the coating system and the methods of applying the coating system to the compressor blade reduce the wear of blade material during high-speed rubs against a bare compressor casing and may thereby increase the lifetime of the compressor blade. The coating system includes a ceramic coating that is harder than the material in which the compressor case is formed.

Without intending to be limited by theory, the difference in hardness of the coating system and the compressor case may reduce the amount of material that is rubbed off of the blade. In some embodiments, the coating system may have a higher failure strain. Because of this, the coating system may generate larger forces when rubbing against the casing and require more energy to be removed from the blade tip. Less material may be removed from the blade tip, increasing the lifespan of the blade.

With certain blades the amount of material loss at the blade tip is typically equivalent to the incursion or interference depth. Turbine blades typically have a 1:1 rub ratio (the ratio of blade material lost to interference). However, compressor blades, particularly aft compressor blades, can have a high rub ratio due to their design and geometry, such as a curved airfoil. When running at high speeds, the airfoil may be pushed radially up to an almost standing position, thereby rubbing more against the compressor case. Rub ratios as high as 8:1 or 10:1 have been previously observed for high pressure compressors. The compressor blades can rub on the casing during certain transients, and upon rub, the blades can lose a substantially higher amount of material than the magnitude of the interference. This high rub ratio leads to high blade wear, thereby opening the clearance between blade tip to the casing, which results in loss of flow that does useful work. High rub ratios have a significant impact on engine performance and operability. Thus, reducing the rub ratio may improve the compressor performance and operability. The present coating system incorporates a ceramic material with a higher hardness than that of the compressor case. The harder coating system may reduce blade loss during a rub event and may result in reduced clearance between the stator and rotor during all engine operating conditions. The coating system may thereby improve the specific fuel consumption (SFC) of the engine, resulting in increased fuel economy.

In addition, when removed, the coating system may wear out cleanly, without building any material deposition on the casing. When a bare blade and a bare compressor casing rub against each other, the rubbing creates a scab, or deposition of the blade material on the casing. The scab can act as a cutting tool to remove more material from the blade tip. The presence of the hard coating system can help reduce the blade wear, by reducing scab build up. The coating system can thereby (a) reduce damage to the blade tip during a rubbing event between stator and rotor, (b) reduce high rub ratio occurrences, and (c) achieve a tighter clearance between the stator and rotor during engine operations.

The coated compressor blade can be utilized as a component for a gas turbine engine. In particular, the coated compressor blade can be positioned within a gas flow path of a gas turbine engine such that the coating system protects the compressor blade within the gas turbine engine. The coating system may be applied to any stage of the compressor. The coating system may be applicable to blades in a high pressure compressor (HPC), fan, booster, high pressure turbine (HPT), and low pressure turbine (LPT) of both airborne and land-based gas turbine engines.

Figure 1B:
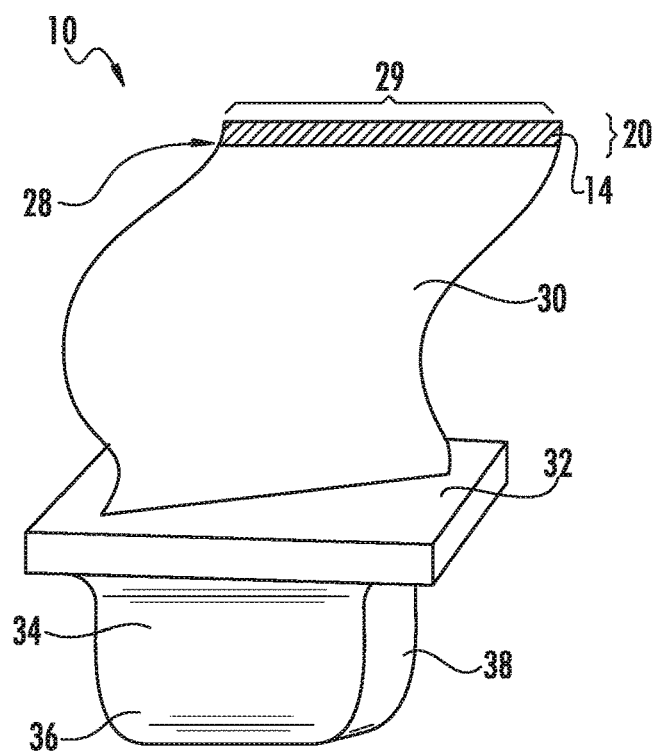

FIGS. 1a and 1b are schematic views of an exemplary compressor blade comprising a coating system in accordance with one embodiment of the present disclosure. In particular, FIG. 1a is a cross-sectional schematic view of a compressor blade 10 comprising a base material 12 and a surface 16. In the embodiment illustrated in FIG. 1a, a coating system 20 comprising a ceramic material 14 is disposed along the surface 16 of the compressor blade 10. The coating system 20 has a surface 18.

FIG. 1b is a schematic of a compressor blade 10 illustrating the various parts of the compressor blade 10. In the embodiment illustrated in FIGS. 1a and 1b, the blade 10 is generally represented as being adapted for mounting to a disk or rotor within the compressor section of an aircraft gas turbine engine (illustrated in FIG. 3). For this reason, the blade 10 is represented as including a dovetail 38 for anchoring the blade 10 to a compressor disk by interlocking with a complementary dovetail slot formed in the circumference of the disk. As represented in FIG. 1b, the interlocking features comprise protrusions referred to as tangs 36 that engage recesses defined by the dovetail slot. The blade 10 is further shown as having a platform 32 that separates an airfoil 30 from a shank 34 on which the dovetail 38 is defined.

The blade 10 includes a blade tip 28 disposed opposite the platform 32. As such, the blade tip 28 generally defines the radially outermost portion of the blade 10 and, thus, may be configured to be positioned adjacent to a stationary casing (illustrated in FIG. 3) of the compressor. The length of the blade tip 28 may be referred to as the blade chord 29.

As shown in FIG. 1b, the airfoil 30 of the compressor blade 10 is a generally curved body in that a portion of the airfoil 30 bends out away from the blade tip 28. During use, force applied to the compressor blade 10 may push the generally curved body into a more straightened position forcing the blade tip 28 to contact the casing, causing a rub event between the blade tip 28 and the casing. The blade tip 28 may be referred to as the interface between the blade and the casing and may be referred to as the rubbing area between the blade and the casing.

In certain embodiments, the blade tip 28 comprises a base material 12. In some embodiments, the base material 12 may include a metal such as steel or superalloys (e.g., nickel-based superalloys, cobalt-based superalloys, or iron-based superalloys), or combinations thereof.

As shown in FIG. 1b, in this embodiment, the blade tip 28 is coated with a coating system 20. The coating system 20 is disposed along the blade tip 28 in FIG. 1a, and may be disposed along the blade tip 28 as well as other portions of the airfoil 30. The coating system 20 may cover at least a portion of the blade tip 28, and in some cases, the coating system 20 may cover the portion of the blade tip 28 most immediately adjacent to the casing when positioned in the compressor section of the engine (see FIG. 3).

The coating system 20 is configured such that rubbing and softening of the blade tip 28 may be reduced. The coating system incorporates components that have a higher hardness than the compressor casing and thereby protect the underlying metal of the base material 12 of the blade tip 28 from rubbing events. For instance, in certain embodiments, the coating system 20 may comprise a ceramic material 14 with a higher hardness than the compressor case in which the compressor blade is to be used. Various ceramic materials may be suitable in the coating system 20. In some embodiments, the ceramic material may be a thermal barrier coating ("TBC"). As used herein, "TBC" or "TBCs" is used to refer to stabilized ceramics that can sustain a fairly high temperature gradient such that the coated metallic components can be operated at environmental temperatures higher than the metal's melting point. While the coating system 20 does not necessarily need to be capable of operating at high temperatures, the ceramic material may be a thermal barrier coating. For instance, the TBC may be one or more of yttria stabilized zirconia (YSZ), mullite ($3Al_2O_3\text{-}2SiO_2$), alumina ($Al_2O_3$), ceria ($CeO_2$), rare-earth zirconates (e.g., $La_2Zr_2O_7$), rare-earth oxides (e.g., $La_2O_3$, $Nb_2O_5$, $Pr_2O_3$, $CeO_2$), and metal-glass composites, and combinations thereof (e.g., alumina and YSZ or ceria and YSZ). Zirconia may be stabilized with a multitude of other oxides including CaO, MgO, $CeO_2$, and also many rare earth oxides such as $Gd_2O_3$, $Yb_2O_3$, $La_2O_3$ to name a few. In addition to stabilized zirconates, several alumina based compounds with $TiO_2$, $ZrO_2$, $SiO_2$, $Y_2O_3$ in various ratios would be suitable. Silicate coatings including Zircon ($ZrSiO_4$) and hafnon may be used. Chromium oxide and mixtures of chromium oxide with $TiO_2$, $SiO_2$, and $Al_2O_3$ may also be used.

The ceramic coating may be formed by any suitable process. For instance, one or more ceramic materials may be deposited on the compressor blade by air-plasma spray (APS), electron beam physical vapor deposition (EBPVD), high velocity oxygen fuel (HVOF), electrostatic spray assisted vapor deposition (ESAVD), and direct vapor deposition. Tip grinding may occur before or after application of the coating system 20.

In some embodiments, the ceramic material 14 may be applied to the blade tip 28 to form one or more layers of ceramic material 14. In certain embodiments, the ceramic material 14 may be applied to the blade tip 28 such that the ceramic material 14 becomes dispersed throughout another layer, such as dispersed throughout a matrix of another component along the blade tip 28. In such an embodiment, the ceramic material phase can be a discontinuous phase within the matrix or a continuous phase within the matrix. One or more ceramic materials 14 may be used along the blade tip 28. For instance, a plurality of ceramic materials may be applied to the blade tip 28 and may form one or more ceramic materials along the blade tip 28. Various alternative configurations are possible without deviating from the intent of the present disclosure.

The coating system 20 may have a thickness of about 1 mils (about 25 microns) to about 20 mils (about 508 microns), such as about 2 mils (about 50 microns) to about 15 mils (about 381 microns), about 3 mils (about 76 microns) to about 12 mils (about 305 microns), or about 5 mils (about 127 microns) to about 10 mils (about 254 microns). As shown in FIG. 1b, in this embodiment, the coating system 20 is disposed with a uniform thickness along the chord 29 of the blade tip 28. For instance, the coating system 20, in some embodiments, may have a thickness of about 5 mils to about 10 mils along the full chord 29 of the blade tip 28.

Figure 2A:
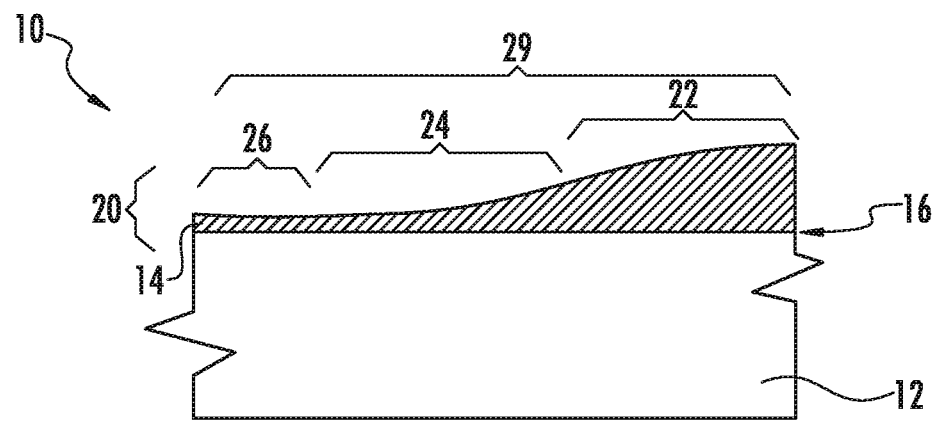
FIGS. 2a and 2b are schematic views of an exemplary compressor blade comprising a coating system in accordance with one embodiment of the present disclosure.
Figure 2B:
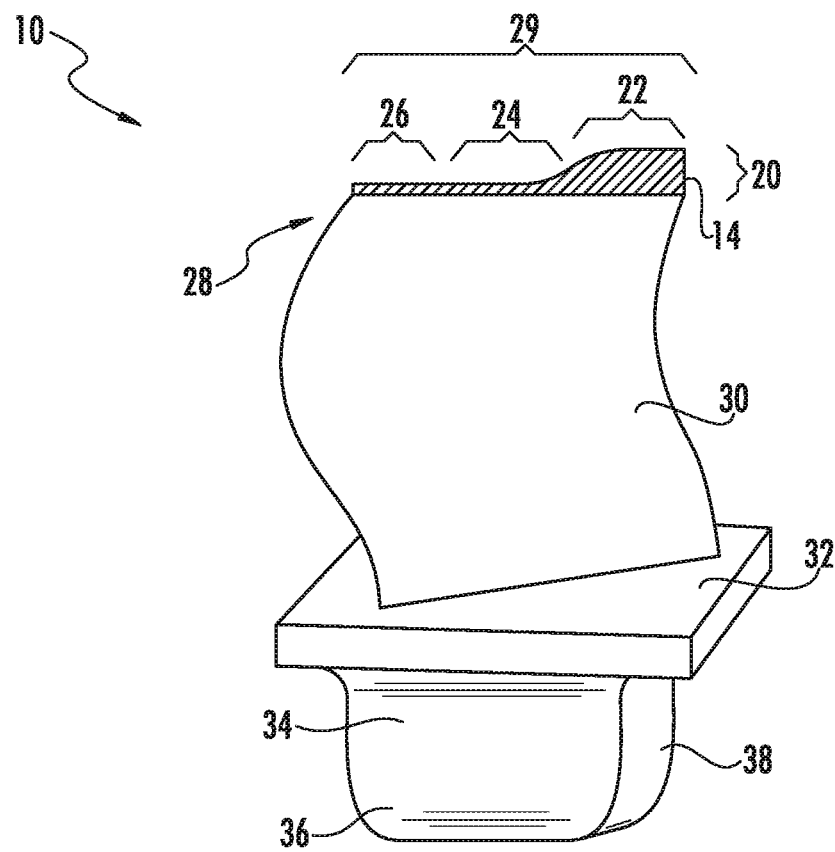

In some embodiments, the coating system 20 may be disposed along certain areas of the blade tip 28 with different thicknesses. FIGS. 2a and 2b are schematic views of an exemplary compressor blade comprising a coating system in accordance with one embodiment of the present disclosure where the thickness of the coating system 20 varies along the length of the chord 29. In particular, FIG. 2a is a cross-sectional schematic view of a compressor blade 10 comprising a base material 12 and a surface 16. In the embodiment illustrated in FIG. 2a, a coating system 20 comprising a ceramic material 14 is disposed along the surface 16 of the compressor blade 10. The coating system 20 has a surface 18. FIG. 2b is a schematic of a compressor blade 10 illustrating the various part and geometry of the compressor blade 10 as noted above.

As shown in FIG. 2b, the chord 29 may be divided into sections, such as a leading edge 22, mid-chord 24, and trailing edge 26. The coating system 20 may be disposed along one or more sections of the chord 29, such as only disposed along the leading edge 22, only disposed along the mid-chord 24, or only disposed along the trailing edge 26. In some embodiments, the coating system 20 may be disposed along two or more of these sections of the chord 29 with the same or differing thicknesses. For instance, in the embodiment illustrated in FIG. 2b, the coating system 20 is disposed along the leading edge 22 with a greater thickness than the coating system in the mid-chord 24 and the trailing edge 26. The coating system 20 may have a thickness of about 1 mils (about 25 microns) to about 20 mils (about 508 microns), such as about 2 mils (about 50 microns) to about 15 mils (about 381 microns), about 3 mils (about 76 microns) to about 12 mils (about 305 microns), or about 5 mils (about 127 microns) to about 10 mils (about 254 microns) in the leading edge 22, mid-chord 24, and/or trailing edge 26. In some embodiments, the thickness of the coating system 20 may be about 5 mils to about 10 mils in the leading edge 22 while the thickness of the coating system 20 may be less than 5 mils, if present, in the mid-chord 24 and/or the trailing edge 26. In some embodiments, the leading edge 22 may have the highest reduction in rub ratio due to the application of the coating system. Thus, it may be suitable to apply the coating system 20 to the leading edge 22 with a greater thickness than the mid-chord 24 and/or the trailing edge 26.

Figure 3:
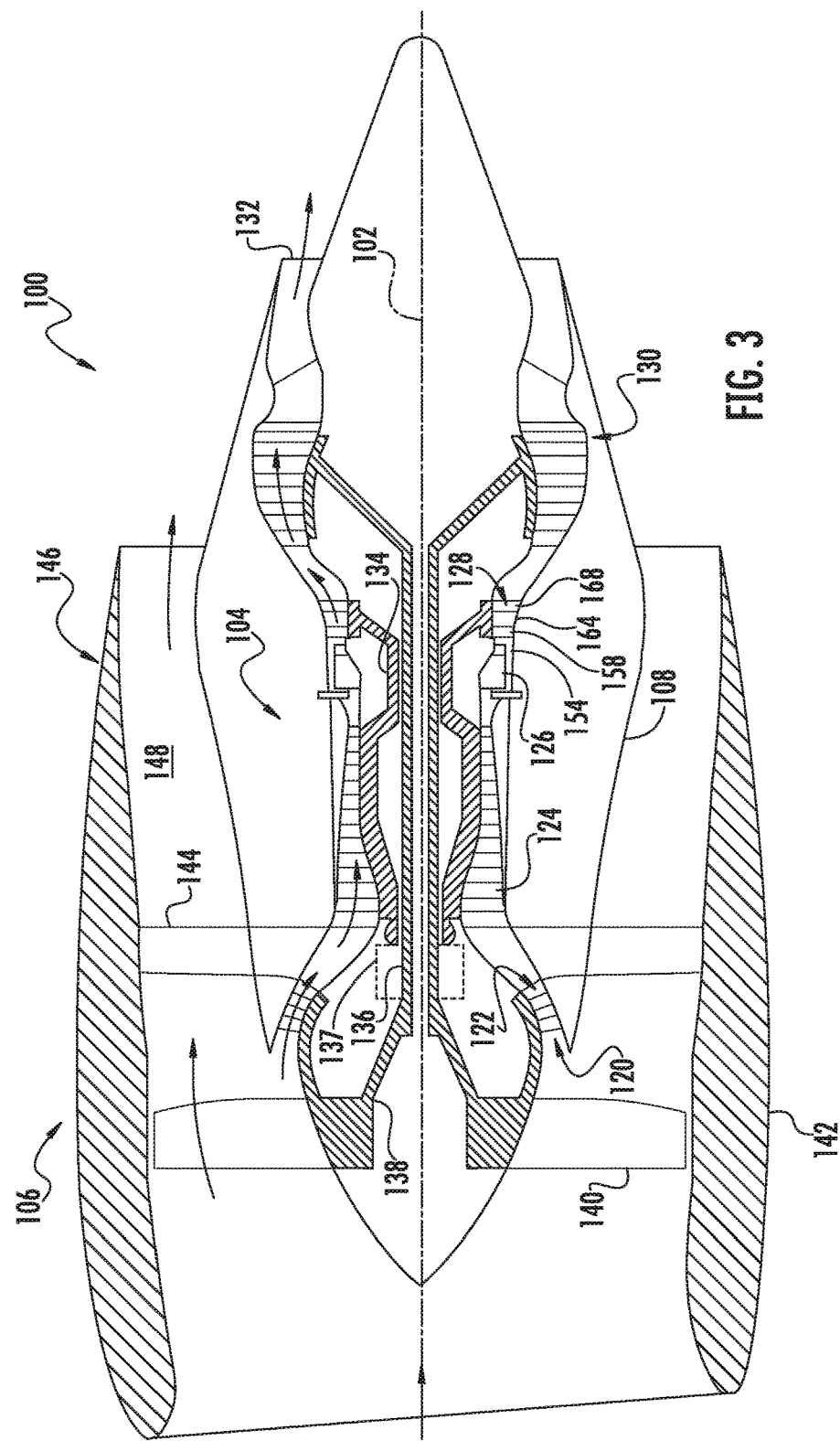
FIG. 3 is a schematic cross-sectional view of an exemplary gas turbine engine in accordance with one embodiment of the present disclosure.

FIG. 3 is a schematic cross-sectional view of a gas turbine engine in accordance with one embodiment of the present disclosure. Although further described below generally with reference to a turbofan engine 100, the present disclosure is also applicable to turbomachinery in general, including turbojet, turboprop and turboshaft gas turbine engines, including industrial and marine gas turbine engines and auxiliary power units.

As shown in FIG. 3, the turbofan 100 has a longitudinal or axial centerline axis 102 that extends therethrough for reference purposes. In general, the turbofan 100 may include a core turbine or gas turbine engine 104 disposed downstream from a fan section 106.

The gas turbine engine 104 may generally include a substantially tubular outer casing 108 that defines an annular inlet 120. The outer casing 108 may be formed from multiple casings. The outer casing 108 encases, in serial flow relationship, a compressor section having a booster or low pressure (LP) compressor 122, a high pressure (HP) compressor 124, a combustion section 126, a turbine section including a high pressure (HP) turbine 128, a low pressure (LP) turbine 130, and a jet exhaust nozzle section 132. A high pressure (HP) shaft or spool 134 drivingly connects the HP turbine 128 to the HP compressor 124. A low pressure (LP) shaft or spool 136 drivingly connects the LP turbine 130 to the LP compressor 122. The LP spool 136 may also be connected to a fan spool or shaft 138 of the fan section 106. In particular embodiments, the LP spool 136 may be connected directly to the fan spool 138 such as in a direct-drive configuration. In alternative configurations, the LP spool 136 may be connected to the fan spool 138 via a speed reduction device 137 such as a reduction gear gearbox in an indirect-drive or geared-drive configuration. Such speed reduction devices may be included between any suitable shafts/spools within engine 100 as desired or required.

As shown in FIG. 3, the fan section 106 includes a plurality of fan blades 140 that are coupled to and that extend radially outwardly from the fan spool 138. An annular fan casing or nacelle 142 circumferentially surrounds the fan section 106 and/or at least a portion of the gas turbine engine 104. It should be appreciated by those of ordinary skill in the art that the nacelle 142 may be configured to be supported relative to the gas turbine engine 104 by a plurality of circumferentially-spaced outlet guide vanes 144. Moreover, a downstream section 146 of the nacelle 142 (downstream of the guide vanes 144) may extend over an outer portion of the gas turbine engine 104 so as to define a bypass airflow passage 148 therebetween.

Figure 4:
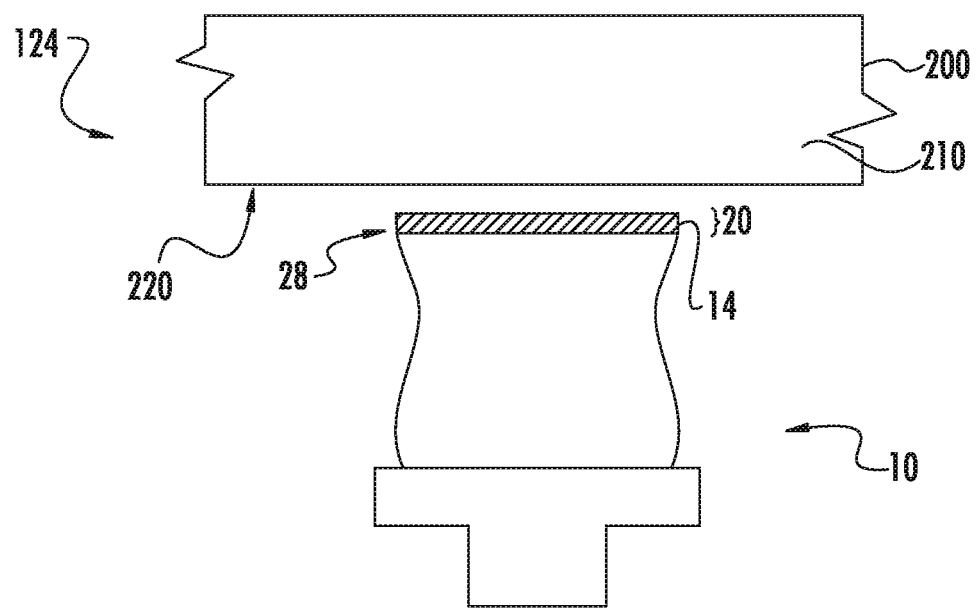
FIG. 4 illustrates an exemplary compressor section in accordance with one embodiment of the present disclosure.

FIG. 4 illustrates an exemplary compressor section in accordance with one embodiment of the present disclosure. In particular, FIG. 4 illustrates a high pressure compressor 124 including a compressor casing 200 with a base material 210 and an inner surface 220. The coating system 20 may be applied to any stage of the compressor. The high pressure compressor 124 also includes a compressor blade 10. In certain embodiments, the base material 210 may include a metal such as steel or superalloys (e.g., nickel-based superalloys, cobalt-based superalloys, or iron-based superalloys), or combinations thereof. As shown in FIG. 4, the compressor case 200 is uncoated. As used herein, "uncoated" or "bare" refers to the absence of a coating or additional layer applied to the based material of the component. For instance, as shown in FIG. 4, the base material 210 of the compressor case 200 extends to the inner surface 220 of the compressor case 200. No abradable coating or additional protective coating is needed for the compressor case 200 in this embodiment.

In the embodiment illustrated in FIG. 4, the compressor blade 10 includes a coating system 20 comprising a ceramic material 14 disposed along the blade tip 28. The coating system 20 has a higher hardness than the base material 210 of the compressor case 200. For instance, the coating system 20 may have a hardness of about 10 HRC to about 90 HRC, such as about 15 HRC to about 85 HRC, about 20 HRC to about 80 HRC, or about 25 HRC to about 75 HRC. The coating system 20 may be at least about 5% harder, such as about 10% to about 50%, or about 10% to about 40% harder than the base material 210 of the compressor case 200. The coating system 20 may have a Young's modulus of about 5% greater than, such as about 10% to about 50%, or about 10% to about 40% greater than the Young's modulus of the base material 210 of the compressor case 200.

Figure 5:
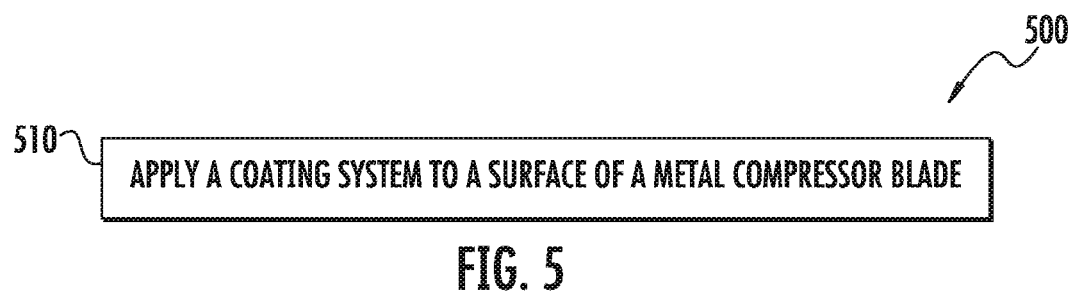
FIG. 5 is an exemplary method of preparing a coating system in accordance with one embodiment of the present disclosure.

FIG. 5 is a method of preparing a coating system in accordance with one embodiment of the present disclosure. In the embodiment illustrated in FIG. 5, the method of preparing a coated compressor blade 500, particularly a coated compressor blade configured for use with a bare compressor casing, comprises the step of applying a coating system to a surface of a metal compressor blade 510. The coating system comprises a ceramic material. For instance, the coating system may be applied to the blade tip of the compressor blade and may be applied specifically to the leading edge, mid-chord, and/or trailing edge of the compressor blade tip. The coating system may be applied by any suitable method as described herein. The method may comprise other treatments to the compressor blade and/or blade tip between each application of coating to further improve blade wear. In some embodiments, a bond coating may be applied to the blade tip to improve adhesion of the ceramic material while in certain embodiments, a bond coat may not be needed. For instance, in some embodiments, where the coating system is used in a compressor, where temperatures are lower than in high pressure turbines, a bond coat may not be needed. In some embodiments, a bond coat may be used to provide an appropriate roughness for adhesion of the ceramic material.

While the present application is discussed in relation to compressor cases, the disclosure may be applied in other applications such as where a coating with a harder material may protect the underlying metal from wear.

EXAMPLES

Figure 6A:
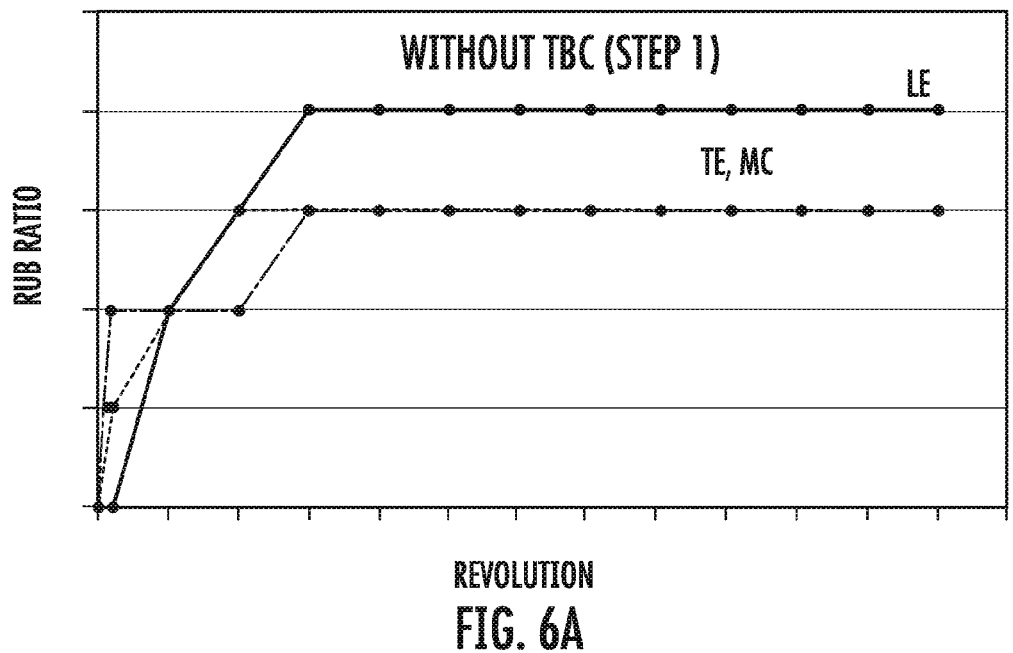
FIGS. 6a and 6b illustrate the effect of a coating system in accordance with one embodiment of the present invention on the rub ratio of a compressor blade.
Figure 6B:
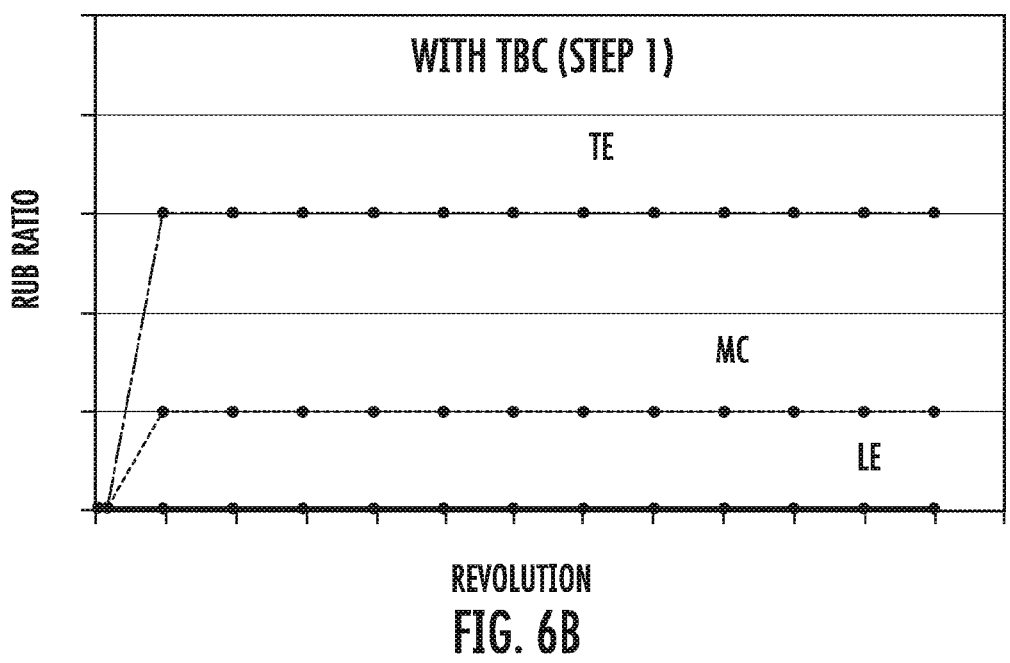

Modeling of compressor blade and case assemblies was performed to evaluate the coating system. FIGS. 6a and 6b illustrate the effect of a coating system in accordance with one embodiment of the present invention on the rub ratio of a compressor blade. As the rub ratio may not be uniform across a blade chord, the rub ratio for the leading edge ("LE"), mid-chord ("MC"), and trailing edge ("TE") are shown in FIGS. 6a and 6b. The rub ratios were modeled using 3D high-fidelity transient dynamics analyses. A portion of the casing was offset to apply a specified incursion (or interference depth) between the case and blade.

Using this modeling framework, baseline stage 8 blades were analyzed under steady state takeoff condition. The rub ratios (ratio of material loss at blade tip to incursion) were obtained at the leading edge, mid chord, and trailing edge of the blade tip (see FIG. 6a). Following this, the baseline blade was modified to incorporate a coating system in accordance with one embodiment of the present invention. The rub analysis was rerun under the same conditions with the modified blade. In this embodiment, the blade tip was coated with a layer of TBC coating. The TBC material was an 8 weight percent $Y_2O_3$-92% $ZrO_2$ stabilized zirconia applied by a suspension plasma spray process. The coating was applied directly to an abrasive blasted blade material substrate. The failure strain of the coating was assumed to be higher, along modulus values obtained from literature. The results showed significant reduction in rub ratio (see FIG. 6b). The modeling did not take into consideration the temperature change and scab formation. Thus, it is expected that the rub ratio will be reduced by more than 50% for LE and ME with the incorporation of the coating system. While this particular model did not show a reduction in the rub ratio at the TE, the rub ratio may be reduced in actual practice for this stage of the compressor as well as other stages.

The contact force for a stage 8 compressor blade was measured with and without a coating system. Four revolutions were run for a blade with no coating system and a TBC coated blade. The force when the blade contacts the casing was much less when the blade is coated with a coating system. As the rubbing continues, the contact forces decrease in general. In the later revolutions, less material is present resulting in lower contact forces in general.

Figure 7:
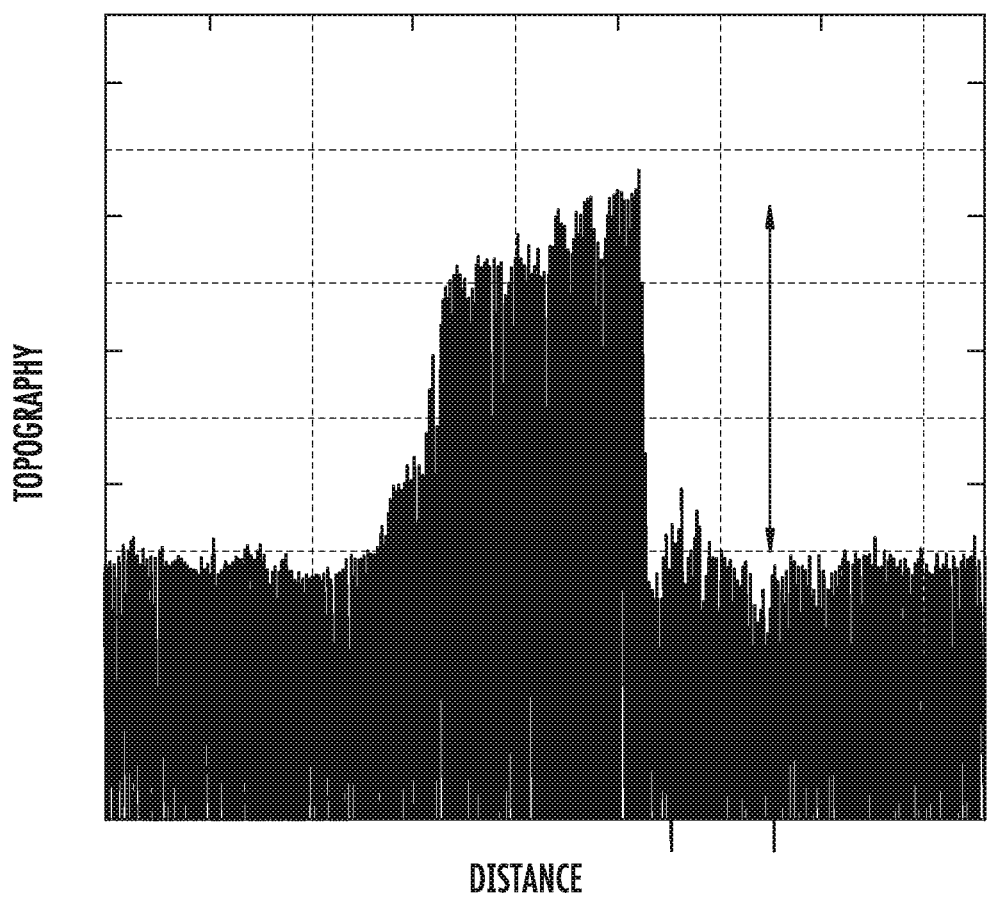
FIG. 7 illustrates the rubbing of a conventional compressor blade and casing.

FIG. 7 illustrates the rubbing seen on a conventional compressor blade and casing using compressor casing and blade coupons. The compressor case and blade coupons were made of a nickel super-alloy. The body of the compressor blade coupon was not curved like an actual compressor blade would be (see e.g., FIG. 1b). Without a coating system on the blade coupon, a significant scab was built up on the compressor case coupon. FIG. 7 illustrates the scab buildup seen on the case coupon.

Figure 8:
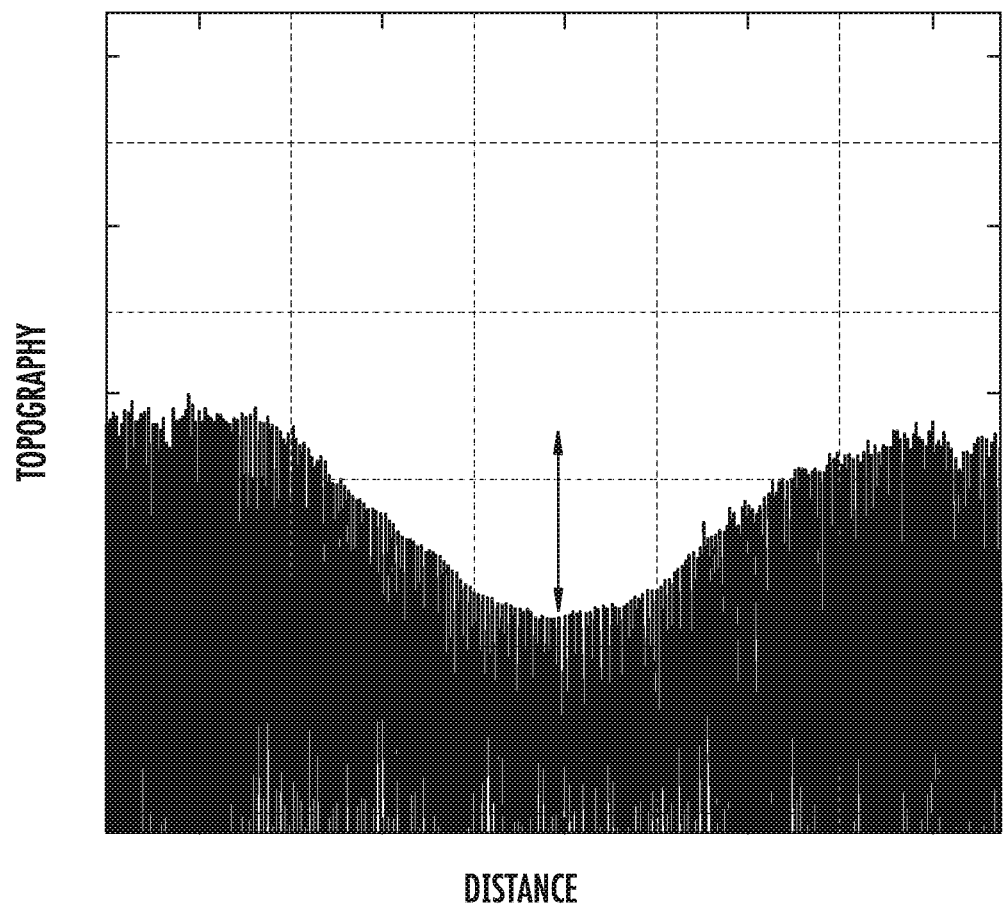
FIG. 8 illustrates the rubbing of a compressor blade and casing in accordance with one embodiment of the present invention.

FIG. 8 illustrates the rubbing seen on a compressor blade and casing in accordance with one embodiment of the present invention. The compressor case and blade coupons were made of a nickel super-alloy and the tip of the blade coupon was coated with TBC. The TBC material was an 8 weight percent $Y_2O_3$-92% $ZrO_2$ stabilized zirconia applied by a suspension plasma spray process. The coating was applied directly to an abrasive blasted blade material substrate. The body of the compressor blade coupon was not curved like an actual compressor blade would be (see e.g., FIG. 1b). FIG. 8 illustrates the topography seen on the case coupon after rubbing with the blade coupon. With the harder coating system on the blade tip, the coupon dug into the compressor case coupon. Considering the thickness of conventional compressor casings, a small depression is not significant and unlike scab buildup on the casing, the depression will not exacerbate rubbing against the blade tip.

Figure 9A:
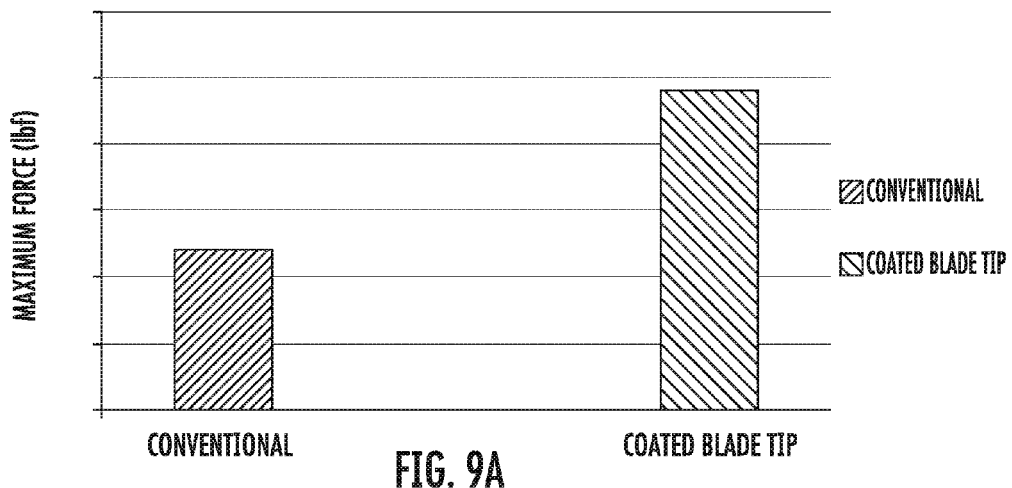
FIGS. 9a and 9b illustrate the maximum force and rub ratio of a conventional compressor blade and case compared to the maximum force and rub ratio of a compressor blade and case in accordance with one embodiment of the present invention.
Figure 9B:
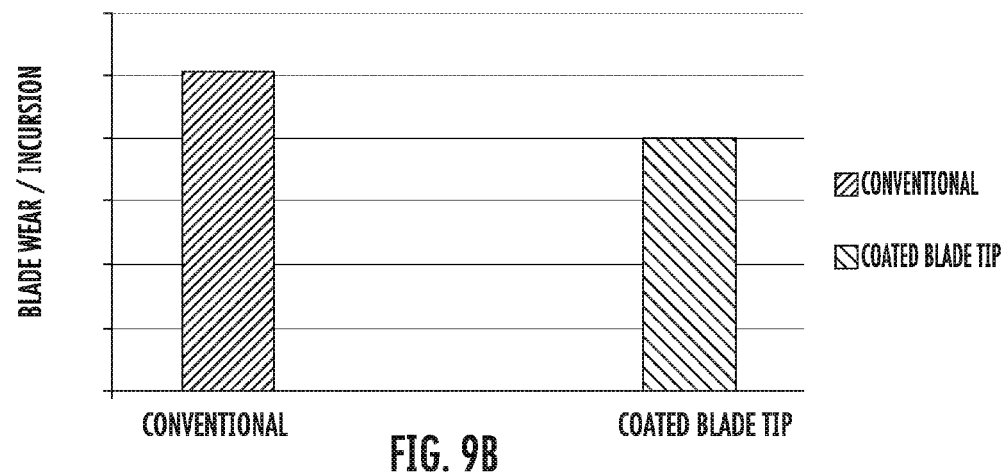

FIGS. 9a and 9b illustrate the maximum force and rub ratio seen in a conventional compressor blade and case coupon compared to the maximum force and rub ratio seen in a compressor blade and case coupon in accordance with one embodiment of the present invention. FIG. 9a illustrates the maximum force (lbf) in the conventional compressor blade and case in comparison to the coated compressor blade and case. As shown in FIG. 9a, the maximum force on the coated blade tip is much higher than that of the conventional compressor blade. Increased force generation indicates increased resistance to wear.

FIG. 9b illustrates the rub ratio (blade wear/incursion) in the conventional compressor blade and case coupon in comparison to the coated compressor blade and case coupon. As noted previously, the blade coupons were not curved like in actual compressor blades (see e.g., FIG. 1b). Considering the blade coupons were not curved, the rub ratio for the uncoated blade coupon and case was less than that seen in actual compressor blades and cases. Thus, the rub ratio reduction is not as significant as that which would be seen in actual compressor blades where the rub ratio is traditionally much higher. A rub ratio decrease of about 30-50% is much more likely in practice with the coating system.

While the invention has been described in terms of one or more particular embodiments, it is apparent that other forms could be adopted by one skilled in the art. It is to be understood that the use of "comprising" in conjunction with the coating compositions described herein specifically discloses and includes the embodiments wherein the coating compositions "consist essentially of" the named components (i.e., contain the named components and no other components that significantly adversely affect the basic and novel features disclosed), and embodiments wherein the coating compositions "consist of" the named components (i.e., contain only the named components except for contaminants which are naturally and inevitably present in each of the named components).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A coated compressor blade, the coated compressor blade comprising:
   a compressor blade having a blade tip with a surface, wherein the compressor blade comprises a base material, and
   a coating system comprising a ceramic material disposed along the blade tip surface;
   wherein the blade tip surface has a leading edge, a mid-chord, and a trailing edge and the coating system has a larger thickness along the leading edge than along the trailing edge.

2. The coated compressor blade according to claim 1, wherein the ceramic material comprises yttria stabilized zirconia.

3. The coated compressor blade according to claim 1, wherein the blade tip surface has a leading edge, a mid-chord, and a trailing edge and the coating system is disposed along the leading edge and not disposed along the trailing edge.

4. The coated compressor blade according to claim 1, wherein the coating system has a hardness of ¬¬ about 25 HRC to about 75 HRC.

5. The coated compressor blade according to claim 1, wherein coating system has a Young's modulus of about 2900 ksi to about 3500 ksi.

6. The coated compressor blade according to claim 1, wherein the coating system has a thickness of about 127 microns to about 254 microns.

7. The coated compressor blade according to claim 1, wherein the coating system does not include a bond coat.

8. The coated compressor blade according to claim 1, wherein the blade has a curved body.

9. The coated compressor blade according to claim 1, wherein the compressor blade is configured to be positioned in a turbofan engine.

10. A gas turbine engine comprising:
a compressor comprising a compressor case having an inner surface, wherein the compressor case comprises a base material, and a compressor blade having a blade tip, wherein the compressor blade comprises a base material and is uncoated and
a coating system disposed along the blade tip of the compressor blade, wherein the coating system comprises a ceramic material;
wherein the blade tip has a leading edge, a mid-chord, and a trailing edge and the coating system is disposed along the leading edge and not disposed along the trailing edge.

11. The system according to claim 10, wherein the coating system does not include a bond coat.

12. The system according to claim 10, wherein the coating system has a higher hardness than a hardness of the compressor case base material.

13. The system according to claim 10, wherein the coating system has a hardness about 10% to about 50% higher than a hardness of the compressor case base material.

14. A method of preparing a coated compressor blade, the method comprising:
forming a coating system comprising a ceramic material along a surface of a blade tip of a compressor blade;
wherein forming the coating system along the surface of the blade tip comprises forming the ceramic material along a leading edge of the blade tip to a thickness of about 127 microns to about 254 microns and not disposing ceramic material along a trailing edge of the blade tip.

15. The method according to claim 14, wherein forming the coating system along the surface of the blade tip comprises forming the ceramic material along a leading edge of the blade tip to a thickness of about 127 microns to about 254 microns.

16. The method according to claim 14, wherein the coating system has a hardness of ¬¬ about 25 HRC to about 75 HRC.

17. The method according to claim 14, wherein the coating system has a Young's modulus of about 2900 ksi to about 3500 ksi.

* * * * *